US009019544B2

(12) United States Patent
Tatsuta

(10) Patent No.: US 9,019,544 B2
(45) Date of Patent: Apr. 28, 2015

(54) IMAGE DISPLAY DEVICE AND PRINTING METHOD

(71) Applicant: Kabushiki Kaisha Toshiba, Minato-ku (JP)

(72) Inventor: Shinichi Tatsuta, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/203,670

(22) Filed: Mar. 11, 2014

(65) Prior Publication Data

US 2014/0293326 A1    Oct. 2, 2014

(30) Foreign Application Priority Data

Mar. 27, 2013   (JP) ................................. 2013-066954

(51) Int. Cl.
*H04N 9/47*   (2006.01)
*G06K 15/02*   (2006.01)
*G09G 3/20*   (2006.01)

(52) U.S. Cl.
CPC . *G06K 15/02* (2013.01); *G09G 3/20* (2013.01)

(58) Field of Classification Search
USPC ........................................... 358/1.15; 348/59
See application file for complete search history.

(56) References Cited

U.S. PATENT DOCUMENTS

| 6,992,795 | B1 * | 1/2006 | Fujita | 358/1.9 |
| 7,924,330 | B2 * | 4/2011 | Xu et al. | 348/243 |
| 2009/0160979 | A1 * | 6/2009 | Xu et al. | 348/243 |

FOREIGN PATENT DOCUMENTS

| JP | 7-281328 | 10/1995 |
| JP | 2007-199452 | 8/2007 |
| JP | 4357814 | 11/2009 |
| JP | 4759728 | 8/2011 |

OTHER PUBLICATIONS

U.S. Appl. No. 14/203,659, filed Mar. 11, 2014, Tatsuta, et al.
U.S. Appl. No. 14/101,885, filed Dec. 10, 2013.

* cited by examiner

*Primary Examiner* — Jerome Grant, II
(74) *Attorney, Agent, or Firm* — Oblon, McClelland, Maier & Neustadt, L.L.P.

(57) ABSTRACT

According to one embodiment, an image display device having a display portion and a deflection element array. The display portion displays a display image including element images arranged in a first direction. The first deflection element array opposes to the element images. Each element image has element pixels having a width W in the first direction. The element pixels are arranged in the first direction and composing N rows. Each N row includes a plurality of the element pixels and arranged in a second direction orthogonal to the first direction. The element pixels of an i-th ($1 \leq i \leq N-1$) row and the element pixels of an (i+1)th row are arranged such that a distance in the first direction between a first reference line along the second direction and a second reference line along the second direction is shifted by at least W/N.

18 Claims, 12 Drawing Sheets

IMAGE DISPLAY DEVICE AND PRINTING METHOD

CROSS-REFERENCE TO RELATED APPLICATION

This application is based upon and claims the benefit of priority from the prior Japanese Patent Application No. 2013-066954, filed on Mar. 27, 2013, the entire contents of which are incorporated herein by reference.

FIELD

Embodiments described herein relate generally to an image display device and a printing method.

BACKGROUND

In an image display device which can provide a stereoscopic view to an observer, a display image which is composed of pixels of images formed in a strip shape and arranged side by side in a horizontal plane, for example, is used. The pixels of images produce disparities. The image display device enables a stereoscopic view based on a binocular disparity by deflecting the pixels using a deflection element array such as lenticular lenses. In this case, as the widths of the pixels in a display image are narrower than pitches of the lenticular lenses, it is possible to increase the number of disparity images i.e. the number of disparities.

The width of a pixel depends on a minimum line width which can be printed by a printing machine for printing a display image. In a case of a general printing machine, resolution on a specification and a printable minimum line width do not necessarily match. Even when the resolution is high and fine control of pixel intervals or positions can be performed, the widths of the pixels cannot be narrowed compared with the resolution so that increase of the number of disparities is restricted to a limited extent.

DETAILED DESCRIPTION

Figure 1:
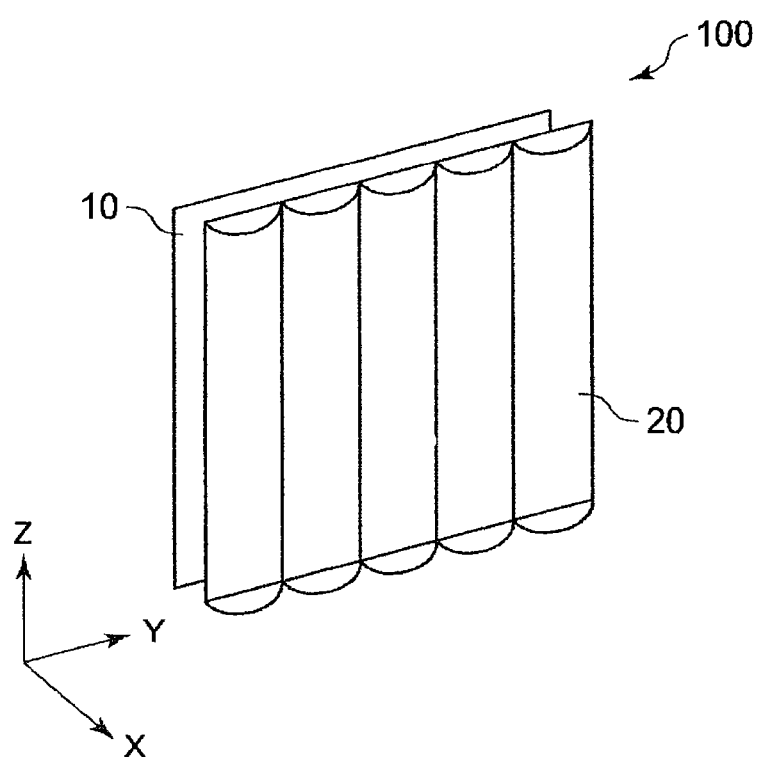
FIG. 1 is a perspective view illustrating an image display device according to a first embodiment.

According to one embodiment, an image display device having a display portion and a deflection element array. The display portion displays a display image including element images arranged in a first direction. The first deflection element array opposes to the element images.

Each of the element images has element pixels having a width W in the first direction. The element pixels are arranged in the first direction and composing N rows. Each of the N rows includes a plurality of the element pixels and arranged in a second direction orthogonal to the first direction. The element pixels of an i-th ($1 \leq i \leq N-1$) row and the element pixels of an (i+1)th row which are the closest to the element pixels of the i-th row in the first direction are arranged such that a distance in the first direction between a first reference line along the second direction which passes a center of each element pixel of the i-th row in the first direction and a second reference line along the second direction which passes a center of each corresponding element pixel of the (i+1)th row is shifted by at least W/N. N denotes a positive integer equal to or more than 2 and i denotes a positive integer.

Hereinafter, further embodiments will be described with reference to the drawings.

In the drawings, the same reference numerals denote the same or similar portions respectively.

A first embodiment will be described with reference to FIG. 1. FIG. 1 is a perspective view illustrating an image display device according to a first embodiment.

In FIG. 1, an image display device 100 has a display portion 10 which is planar along a yz-plane. Further, the image display device 100 has a deflection element array 20 which is planar along the yz-plane.

The display portion 10 is a print sheet where images for producing disparities i.e. display images including disparity image components are printed on, for example, a substrate of paper, resin etc. as an object to be printed. The printed images are projected i.e. displayed as beams directed in an x-axis direction. The deflection element array 20 includes, for example, lenticular lenses, and deflects the beams projected from the display portion 10 in a direction in accordance with disparity image components in a xy-plane. An observer observes the beams deflected by the deflection element array 20 and projected to an observation area, as a stereoscopic image, for example. The observation area is set forwardly in the x-axis direction of the deflection element array 20.

Figure 2:
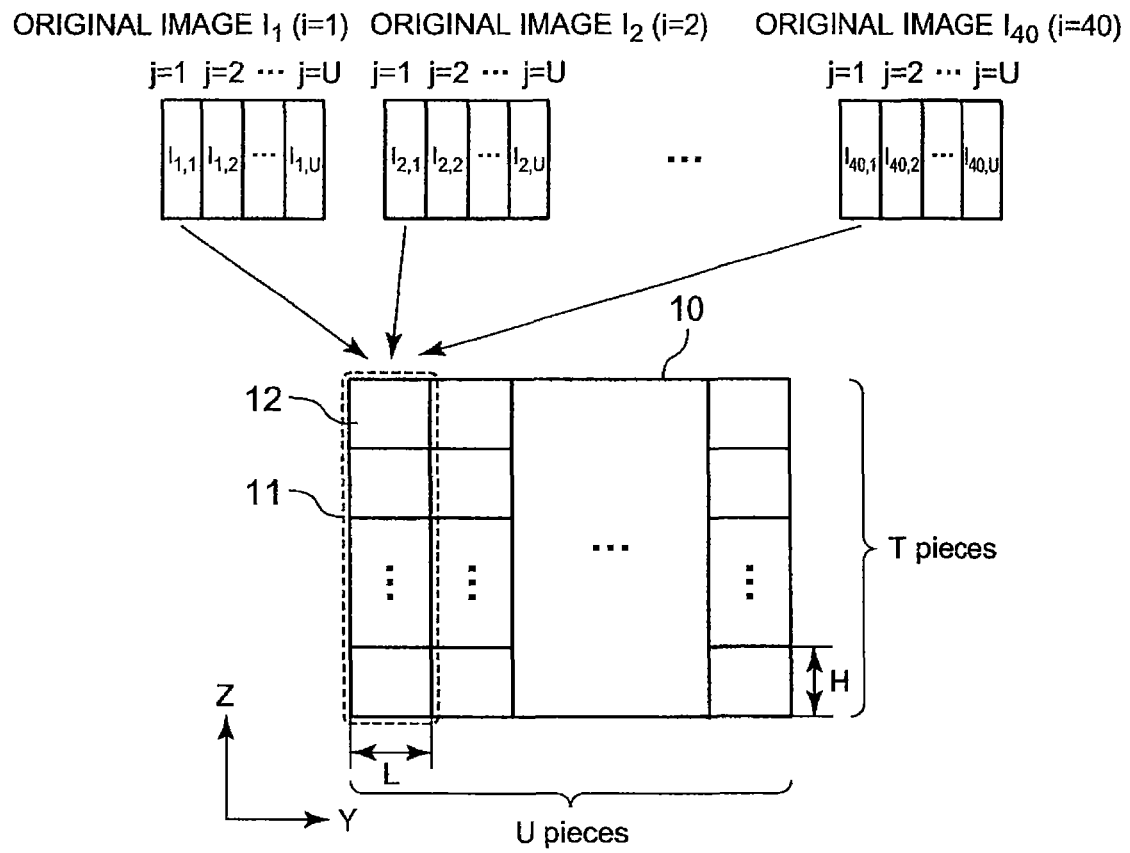
FIG. 2 is a view illustrating a configuration of a display portion of the image display device.

FIG. 2 is a view illustrating a configuration of the display portion 10. The display portion 10 has a printing surface on which a display image is printed. The display image can be created using disparity images provided from multiple cameras for imaging an object to be photographed. The multiple cameras are arranged on a reference plane. The display image may be created using disparity images of a plurality of points of view by creating the disparity images through calculation from images made by rendering. Each of the disparity images the number of which is i is divided into disparity image components the number of which is j. i and j are positive integrals. The disparity image components are image segments of a strip shape, and the display image is created by further aligning element images j in each of which the disparity image components assigned with the same number j are arranged. Hereinafter, an example where a display image is created from 40 disparity images and includes 40 disparities will be described.

In the example shown in FIG. 2, 40 disparity images $I_1$ to $I_{40}$ the number of which is equal to the number of disparities (V=40) are used. In a case where the disparity images are photographed using a camera, for example, the positional relationship between the 40 disparity images corresponds to a relationship between the positions of the camera at the time of imaging. The disparity images are respectively divided into U disparity image components $I_{1,1}$ to $I_{1,U}$, $I_{i,1}$ to $I_{i,U}$, and $I_{40,1}$ to $I_{40,U}$, for example. Each disparity image component includes T pixels (element pixels) in a z-axis direction. The width of each pixel in a y-axis direction i.e. a first direction is denoted by W, and the height of each pixel in the z-axis direction i.e. a second direction is denoted by H. One element image set 11 is configured by aligning 40 disparity image components which hold the positional relationship between the disparity images $I_1$ to $I_{40}$ and whose numbers j are the same, in the y-axis direction in order, and U element image sets 11, ..., 11 are obtained in total.

The width of the element image set 11 in the y-axis direction is denoted by L (=W×V). The element image set 11 includes T element image pixels 12, ..., 12 along the z-axis direction. The width of each element image 12 in the y-axis direction is denoted by W×V, and the height in the z-axis direction is denoted by H. Each element image 12 corresponds to one pixel of each element image set 11. A display image is obtained by aligning the element image sets 11, ..., 11, i.e., the element images 12, ..., 12 along the y-axis direction. T, U and V are arbitrary positive integers.

Figure 3:
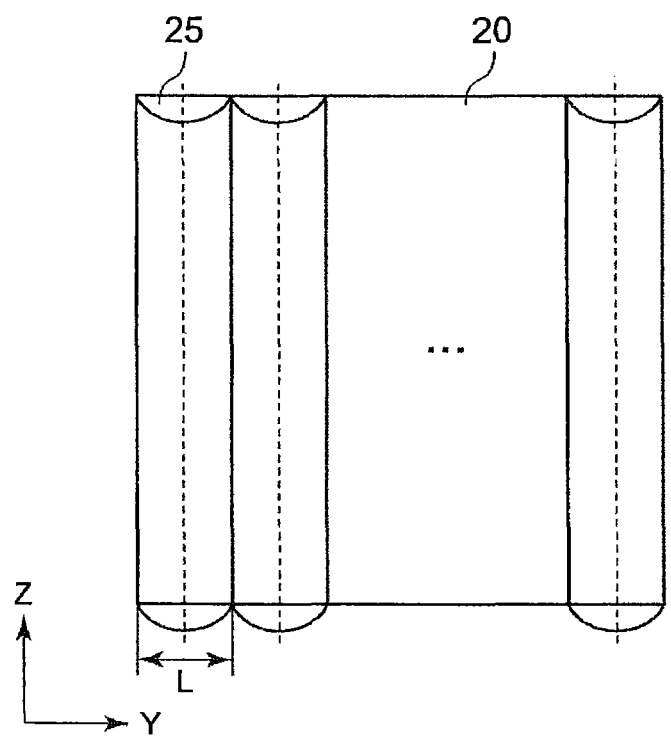
FIG. 3 is a view illustrating a configuration of a deflection element array of the image display device.
Figure 4:
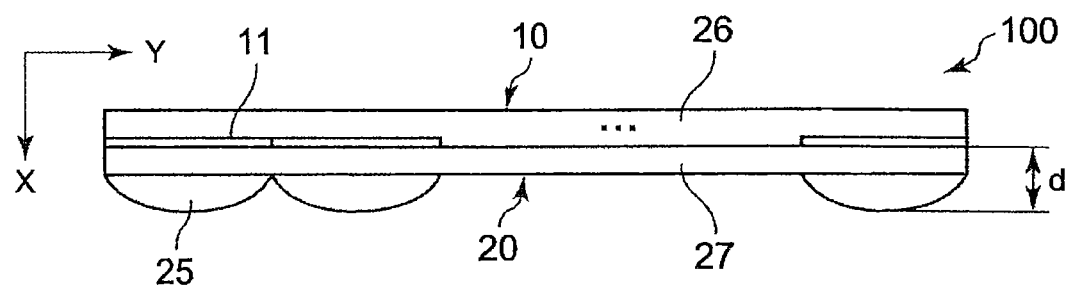
FIG. 4 is a top view illustrating the image display device.

FIG. 3 is a view illustrating a configuration of the deflection element array 20. The deflection element array i.e. a first deflection element array 20 has, along the y-axis direction, cylindrical lenses i.e. first deflection elements 25, ..., 25 which are convex and elongated along the z-axis. Each cylindrical lens 25 has a bus line indicated by a dotted line along the z-axis direction. The width of the cylindrical lens 25 in the y-axis direction is L which is the same as the width of each element image set 11 i.e. each element image 12. As illustrated in FIG. 4, the display portion 10 has a substrate 26 of paper, resin etc. The element image sets 11, ..., 11 are provided on the substrate 26 along the y-axis direction. The deflection element array 20 has a substrate 27 of paper, resin etc. Each cylindrical lens 25 is arranged on the substrate 27 along the y-axis direction so as to oppose to each element image set 11 i.e. each element image 12. A gap may be provided between the deflection element array 20 and the display portion 10. The display portion 10 and the deflection element array 20 may be attached to each other by an adhesive material. Only a peripheral portion of the display portion 10 and a peripheral portion of the deflection element array 20 may be attached to each other by an adhesive material. A peripheral portion of the display portion 10 and a peripheral portion of the deflection element array 20 may be sandwiched by a jig. A back surface of the deflection element array 20 and a front surface of the display portion 10 may be sandwiched by a transparent substrate of resin or glass. The substrate of the display portion 10 may not be provided, and the display image may be directly printed on a back surface of the deflection element array 20

The deflection element array 20 refracts beams from the element images 12, ..., 12 by the cylindrical lenses 25, ..., 25 to deflect in directions corresponding to disparity image components included in the element images 12, ..., 12, respectively. An observer can recognize a stereoscopic image, for example, by observing the deflected beams at an observation area. The above-mentioned directions corresponding to disparity image components are determined based on positions of disparity images including the disparity image components, and can be set in advance.

Figure 5:
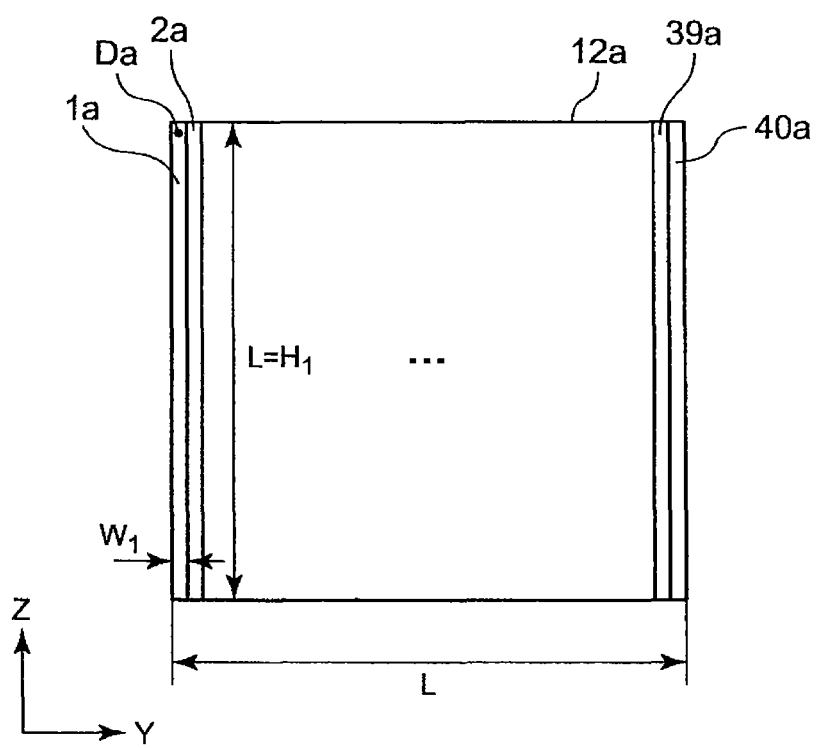
FIG. 5 is a view illustrating a configuration of an element image according to a comparative example.
Figure 6:
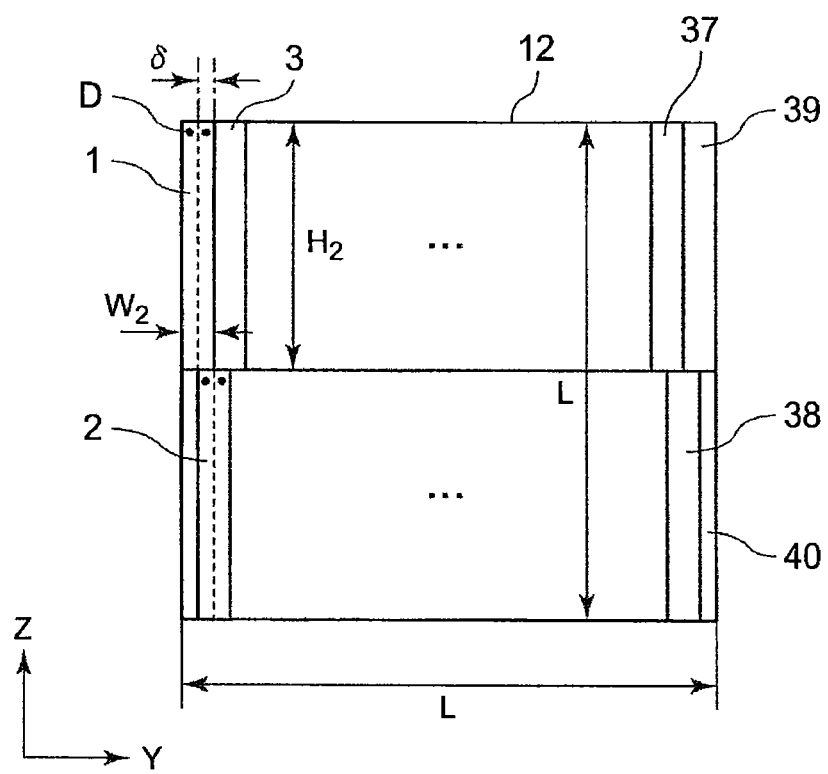
FIG. 6 is a view illustrating a configuration of an element image according to the first embodiment.

Hereinafter, a comparative example and a detail of each element image will be described with reference to FIGS. 5 and 6. FIG. 5 is a view illustrating an element image according to a comparative example, and FIG. 6 is a view illustrating the element image of the image display device according to the first embodiment. An element image 12 illustrated in FIG. 5 has a square shape which has a width L in the y-axis direction and a height L in the z-axis direction. In the element image 12a, pixels (element pixels) 1a to 40a which correspond to one pixel of each disparity image component and the number of which is the same as the number of disparities V are arranged in the y-axis direction. The width of each element pixel in the y-axis direction is denoted by $W_1$ and the height in the z-axis direction is denoted by $H_1$. Da indicates a dot. For example, when a pitch of the deflection element array 20 is 30 LPI (which means that the number of cylindrical lenses per inch is 30), the number of disparity images is 40 i.e. the number of disparities V=40 and the resolution of a printing machine for printing a display image is 1200 [DPI] (which means 1200 dots per inch), first to fortieth element pixels 1a to 40a of disparity images are arranged in the y-axis direction in order to form an element image 12a. The dot indicates a pixel at the time of printing using a printing machine, and means a point of a minimum unit which forms a display image.

Each element pixel has a strip shape, and each element pixel is printed as a modulation block to express a color and a gradation of one pixel of each disparity image. Although halftone processing is generally performed per modulation block, halftone processing may be performed to express a color and a gradation as a whole in combination with adjacent pixels and adjacent blocks.

When element pixels can be printed with the same line width as the resolution of the printing machine for printing a display image, "the number of disparities=40" can be achieved as described above. However, a general printing machine, more particularly, a general-purpose and low-cost printing machine can only control intervals and positions of element pixels with precision of a resolution. Such a general printing machine can not accurately print element pixels which have the same width as the resolution because of performance of the printing machine and halftone processing. Accordingly, in many cases, a printing machine can provide accurate element pixels only when the line width is twice or more the solution, or a printing machine prints data to be printed by puncturing the data every several other dots.

Accordingly, it is difficult to achieve "the number of disparities=40" illustrated in the example in FIG. 5 since the number of disparities is based on element pixels of the same width as the resolution, and the line width of the element pixels needs to be made twice or more the resolution to prevent deterioration of image quality. In this case, when the line width of the element pixels is simply made twice or more the resolution, the number of disparities decreases to half or less.

FIG. 6 is a view illustrating an element image of the image display device according to the embodiment. D indicates a dot. An element image 12 illustrated in FIG. 6 has a square shape of a width L in a y-axis direction and a height L in a z-axis direction. The element image 12 has two rows of V/2 pieces of element pixels having a width $W_2$ in the y-axis direction and a height $H_2$ in the z-axis direction which are arranged in two stages. In this case, V is an even number. The two rows are adjacently arranged in the z-axis direction, and the element image 12 has the element pixels 1 to 40 whose number is equal to the number of disparities V as a whole. The element pixels 1, 3, . . . , 37, 39 included in the first row and the element pixels 2, 4, . . . , 38, 40 included in the second row are arranged to shift in the y-axis direction by a shift amount $\delta = W_2/2$. The shift amount $\delta$ indicates a distance along the y-axis direction between a reference line i.e. a first reference line which passes the center of each element pixel of the first row positioned in the y-axis direction and extends along the z-axis and a reference line i.e. a second reference line which passes the center of each corresponding element pixel of the second row positioned in the y-axis direction and extends along the z-axis.

The element image shown in FIG. 6 and the element image 12 shown in FIG. 5 are compared, and it is found that the relationships of $W_2 = 2W_1$ and $H_2 = H_1/2$ are hold. Thus, each element pixel of FIG. 6 is more accurately printed by making the width of the element pixel in the y-axis direction twice as large as that of the element image 12a of FIG. 5. Accordingly, it is possible to prevent deterioration of image quality. Further, in the comparative example of FIG. 5, when the size of the element image 12a is the same as that of the element image 12 according to the embodiment and the width of each element pixel in the y-axis direction is made twice so as to print each element pixel accurately, the number of disparities decreases to V/2.

In the embodiment, even when the size of the element image 12 is made the same as that of the element image 12a of the comparative example and the width of the element pixel in the y-axis direction is made twice, the number of disparities can remain to be V since the width of the element pixels in the y-axis direction is made twice and the element pixels are provided in two rows. Consequently, when the size of the element image 12 and the width of each element pixel in the y-axis direction are the same, it is possible to increase the number of disparities substantially compared to the element image 12a in FIG. 5.

When, for example, a pitch of the deflection element array 20 is 30 LPI, which means that the number of cylindrical lenses per inch is 30, the number of disparity images is 40 i.e. the number of disparities=40, the resolution of a printing machine is 1200 [DPI], which means 1200 dots per inch and a printable minimum line width is 600 [DPI] which corresponds to twice as large as a line width of the resolution, it is possible to align two rows of element pixels in the z-axis direction while the width of each element pixel is two dots as illustrated in FIG. 6. Among the element pixels, Odd-numbered element pixels are arranged in order in an upper row and even-numbered element pixels are arranged in order in a lower row. Further, each element pixel of the lower row which corresponds to each element pixel of the upper row is arranged to shift in the y-axis direction by the shift amount $\delta$ which is one dot corresponding to the line width of the resolution of the printing machine.

The shift amount $\delta$ in this case is represented by the number of dots corresponding to the distance along the y-axis direction between the reference line i.e. the first reference line which passes the center of each element pixel of the first row in the y-axis direction and extends along the z-axis and the reference line i.e. the second reference line which passes the center of each element pixel of the second row in the y-axis direction and extends along the z-axis. The number of dots corresponding to the distance along the y-axis direction refers to the number of dots which can be arranged in the y-axis direction between the reference lines of the element pixels.

The number of rows needs to be adjusted according to the width of the element pixels by increasing the number of rows of element pixels to three when element pixels can not be accurately printed unless the width of the element pixels is three times as large as the line width of the resolution, and by increasing the number of rows of the element pixels to four when the width is four times as large as the line width of the resolution.

The above relationship may be generalized as follows. One display image in which V disparity images of the same size are rearranged is printed by a printing machine on a printing surface of the display portion 10 of FIG. 1. V is a natural number equal to or more than 2. When the resolution of the printing machine is S [DPI] and the pitch of the deflection element array 20 of FIG. 1 is P [PLI], the element image 12 includes S/P pixels (dots) arranged in the y-axis direction as pixels (dots) to be printed, in a case that a width $Ly=1/P$ [inch] along the y-axis direction. Further, element pixels of disparity image components included in the element image 12 as pixels for printing are printed as modulation blocks which include N pixels (dots) in the y-axis direction and $S/(P \times N)(=Ly \cdot S/N)$ pixels (dots) in the z-axis direction. N is a natural number equal to or more than 2 and equal to or less than S/P, and is a divisor of S/P. When the width of each element pixel arranged in the y-axis direction is denoted by W, the element image 12 has N rows in which $L/W (=V/N)$ element pixels are arranged in the y-axis direction. In this case, element pixels of the i-th ($1 \le i \le N-1$) row and element pixels of the (i+1)th row which are the closest to the element pixels of the i-th row in the y-axis direction are printed to be shifted by W/N in the y-axis direction, i.e. by one pixel (one dot) for printing in the embodiment. This shift amount $\delta$ is equal to $\alpha W/N$, and the total sum of the shift amounts of the N rows is equal to W. $\alpha$ is larger than 0 and is smaller than 2.

Printing of an element image may be performed without providing $S/(P \times N)$ pixels as a size of the element image in the z-axis direction. But, the stereoscopic image to be obtained can be seen at an aspect ratio different from the original disparity images. Thus, the element image has a size of $S/(P \times N)$ pixels preferably unless a special visual effect is aimed to be achieved.

The size of each element image is N pixels in the y-axis direction and $S/(P \times N)$ pixels in the z-axis direction. This means that all pixels are not printed and a printed element image has a size corresponding to the number of pixels. When a printable minimum line width is Q [DPI], N is set such that N=S/Q is held. N is set in this manner, since an actual size of each element image become larger than the N pixels in the y-axis direction and $S/(P \times N)$ pixels in the z-axis direction when all pixels of each element image for printing are printed. Thus, pixels to be printed are adjusted desirably such that the size of each element image is consequently equal to N pixels in the y-axis direction and the $S/(P \times N)$ pixels in the z-axis direction. When S/Q is indivisible, a maximum natural number which allows N<S/Q to be held is set as N desirably. This is because, though an inter-disparity crosstalk can be minimized when N is closer to 1 (one) as much as possible, the size of each element image to be actually printed becomes larger than the N pixels in the y-axis direction and the $S/(P \times N)$ pixels in the z-axis direction as N is smaller than S/Q and, thus, element images which are adjacent to each other in the y-axis direction overlap more significantly.

In the case of the element image in FIG. 6 according to the embodiment, the fortieth element pixel crosses over two cylindrical lenses 25 and, a portion of the element pixel which spreads out is viewed as an undesirable image. In this case, desirably, the fortieth disparity image is not used, is not printed, or is filled with black. When the number of rows of each element image is two, for example, it is desirable that a last element pixel is not used. When the number of rows of each element image is three and four, it is desirable that two last element pixels and the three last element pixels are not used, respectively.

As the image display device according to the embodiment has element pixels included in an element image and arranged in multiple rows, the number of disparities of the element image can be increased. In the above embodiment, a case where one deflection element array is used was described. A plurality of deflection element arrays may be used with the arrays overlaid. Further, a so-called parallax barrier to which a light shielding stripe mask is used can also be used for a deflection element array instead of a lenticular lens. An optical element such as a GRIN lens which deflects light utilizing differences in refractive index without defining a surface shape can also be used for the deflection element array.

A backlight may be employed for the purpose of brightening an image to be seen. The backlight is arranged so as to illuminate a back surface of a display portion with light from the backlight. In this case, a brighter image can be displayed by using a transparent medium for the display portion, since the transmittance of light from the backlight is high. For use as the display portion, a display image may be directly printed on a surface of a deflection element array. Further, as the display portion, an electric display portion such as a liquid crystal panel, a plasma panel, an organic EL panel or electronic paper may be used instead of using printing.

Figure 7:
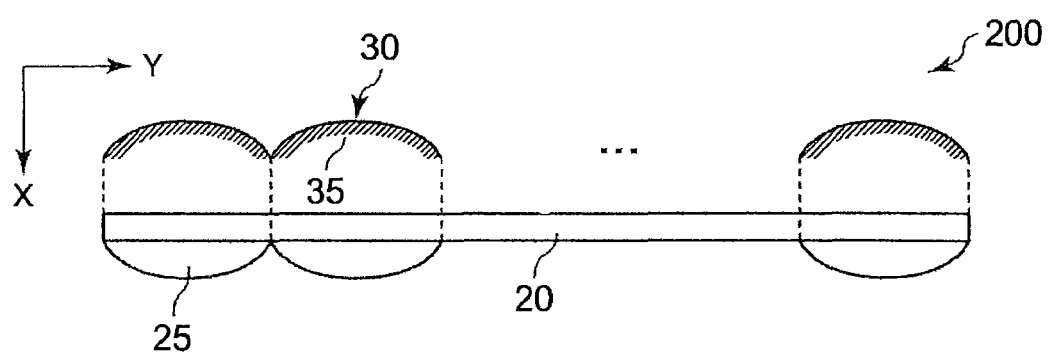
FIG. 7 is a top view illustrating an image display device according to a second embodiment.

FIG. 7 is a top view illustrating an image display device 200 according to a second embodiment. In the first embodiment, the printing surface of the display portion 10 is planar. According to the image display device 200 of the second embodiment, a display portion 30 which has curved surfaces 35 is used.

More specifically, the display portion 30 is provided with the curved surfaces 35 which are concave in a positive direction of an x-axis, along a y-axis direction. The width of each curved surface 35 in the y-axis direction is the same as a width L of the cylindrical lenses 25. In the first embodiment, when a wide viewing area angle is secured in the display portion 10 having a planar shape, a focal surface of each cylindrical lens 25 is curved. As a result, it is difficult accommodate pixels of all disparity image components provided on the printing surface planarly in the focal points of the cylindrical lenses, respectively. Thus, a distribution of beams emitted from pixels becomes in a defocus state partially in cases. Consequently, an inter-disparity crosstalk increases, and characteristics of a stereoscopic image observed by an observer may deteriorate.

In the embodiment, the cross-sectional shape in an xy-plane of each curved surface 35 has a shape which matches with a curve of an image plane produced by each corresponding cylindrical lens 25. When easiness of design or treatment is considered, the cross sectional shape is an arc or a nearly arc desirably and, moreover, the cross sectional shape has the following curvature radius desirably.

When the curvature radius of the curved surface 35 is smaller than infinity (=plane), the curved surface 35 can have a shape which matches a curve of an image plane produced by each cylindrical lens 25 more closely than the planar shape.

Figure 8:
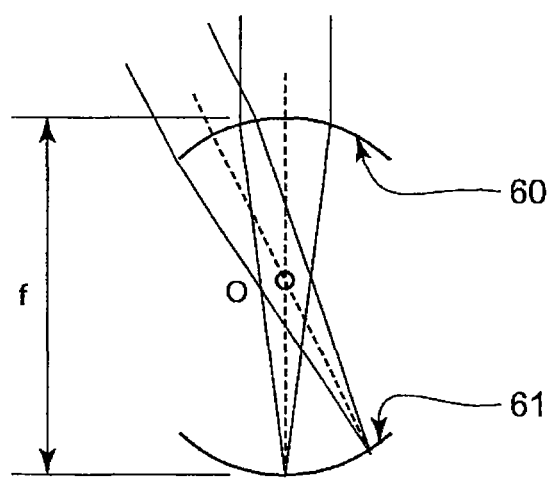
FIG. 8 is a view geometrically-optically illustrating a curvature radius of an image plane.

FIG. 8 is a view geometrically-optically illustrating a curvature radius of an ideal image plane. A light which is vertically incident on a surface 60 of a cylindrical lens is focused at a position which has a focal distance f from the incident surface. The plane on which the focus is formed is an image forming plane 61. A focal distance f is expressed by the following equation (1). n indicates a refractive index of a material of a cylindrical lens, and r indicates a curvature radius of the surface 60 of the cylindrical lens 25.

$$f=nr/(n-1) \quad (1)$$

A light which is obliquely incident on the surface 60 of the cylindrical lens 25 is rotatably symmetrical around a curvature center O of the cylindrical lens 25 and, is focused at the distance f along an optical axis from an incident position, in the same manner as the vertically incident light. Consequently, the curvature radius R of a plane on which light incident on the cylindrical lens 25 from the respective directions is focused is expressed by equation (2).

$$R=f-r=r/(n-1) \quad (2)$$

It is possible to reduce an influence of a curve of an image plane by setting the curvature radius of each curved surface 35 of FIG. 7 to R expressed by equation (2). However, the calculated curvature radius is a simple one which takes only a paraxial beam into account. An extra-axial beam also needs to be taken into account to obtain a more suitable image. The extra-axial beam is focused in front of the position calculated above, mainly due to spherical aberration of a cylindrical lens. Further, a shift of the focus tends to be more significant at a more extra-axial position. Thus, a more suitable curvature radius of the curved surface 35 is smaller than R calculated above.

When the curvature radius R of each curved surface 35 of FIG. 7 is smaller than a half of the width L of the cylindrical lens 25 as expressed by equation (3), the curved surface 35 cannot maintain a concave shape in the entire surface of the display portion 30. Thus, equation (3) expresses a lower limit of the curvature radius.

$$R=L/2 \quad (3)$$

The curvature radius R of the curved surface 35 is desirably in a range expressed by equation (4) in consideration of equation (2) and equation (3).

$$r/(n-1)>R\geq L/2 \quad (4)$$

Figure 9:
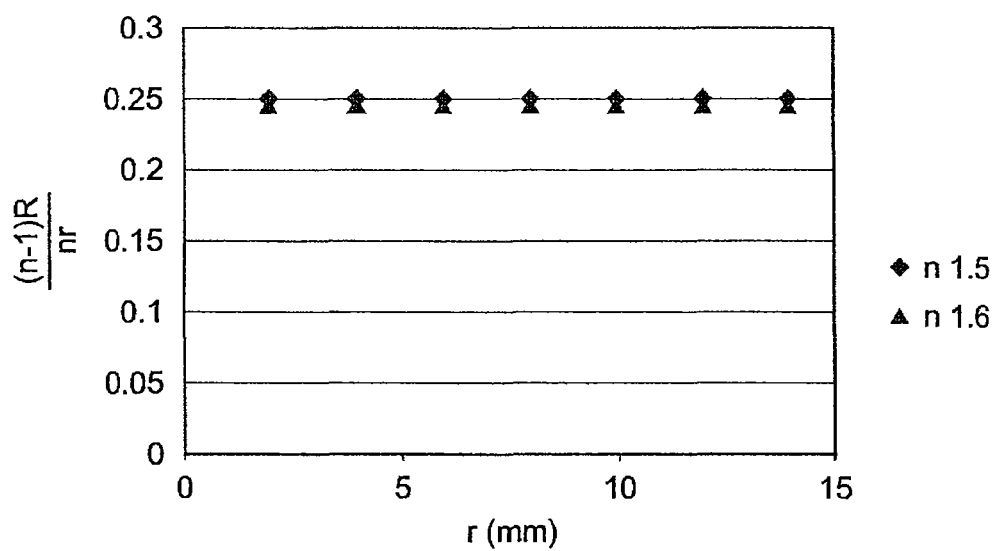
FIG. 9 is a view illustrating an example where optimal solutions of a curvature radius of a curved surface of a display portion are calculated by numerical calculation.

Further, as illustrated in FIG. 9, optimal solutions of the curvature radius R which minimizes an inter-disparity crosstalk was obtained by numerical calculation which was performed by changing the refractive index n and a curvature radius r of a cylindrical lens. It was found that the curvature radius R of the curved surface 35 takes a numerical value which satisfies equation (5) in any cases of the numerical calculation. Thus, it is desirable that the curvature radius R of the curved surface 35 satisfies equation (5). k is a coefficient which satisfies $0.2 \leq k \leq 0.3$ and is preferably k=0.25.

$$R=knr/(n-1) \quad (5)$$

Even when a wide viewing area angle is secured by the setting of the curvature radius R, it is possible to reduce an inter-disparity crosstalk by canceling a curve amount of an image plane produced by a cylindrical lens and to provide a more suitable stereoscopic image.

Figure 10:
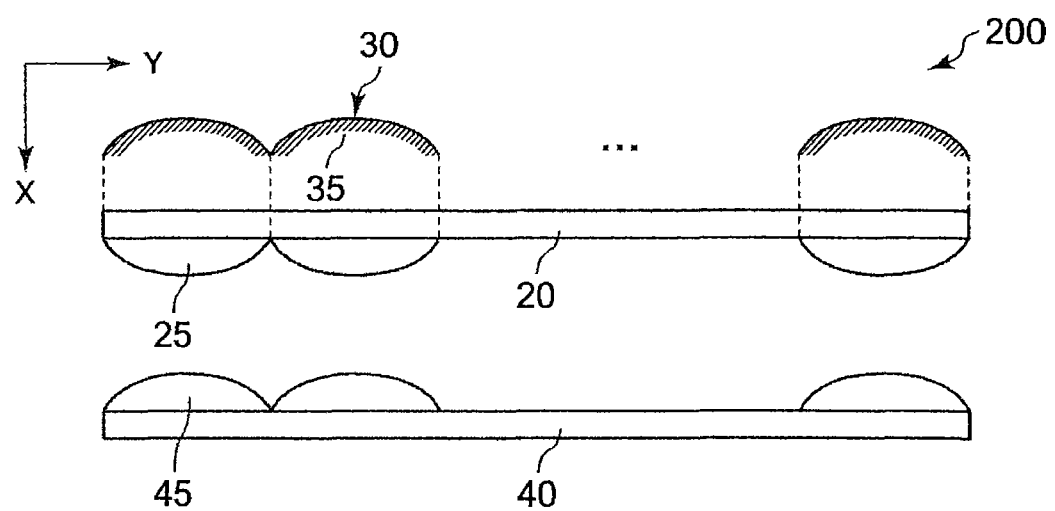
FIG. 10 is a top view illustrating an image display device according to a modified example of the second embodiment.

FIG. 10 is a top view illustrating the image display device 200 according to a modified example of the second embodiment. The image display device 200 further has another deflection element array 40 i.e. a second deflection element array which opposes to the deflection element array 20 i.e. the first deflection element array and which is planar along the yz-plane on an opposite side of the display portion 30 in the x-axis direction. The deflection element array 40 has, along the y-axis direction, cylindrical lenses 45 i.e. second deflection elements which are convex and elongated along the z-axis direction i.e. in a direction vertical to the drawing sheet with FIG. 10 illustrated. Each cylindrical lens 45 has a bus line along the z-axis direction. The width of each cylindrical lens 45 in the y-axis direction is the same as the width L of each cylindrical lens 25.

When the curvature radius R of the curved surface 35 is smaller than infinity (=plane), the curved surface 35 can have a shape a shape which matches a curve of an image plane produced by each cylindrical lens 25 more closely than in a case of providing a plane surface. Thus, an upper limit of a curvature radius is expressed by equation (6).

$$R=\infty \quad (6)$$

Figure 11:
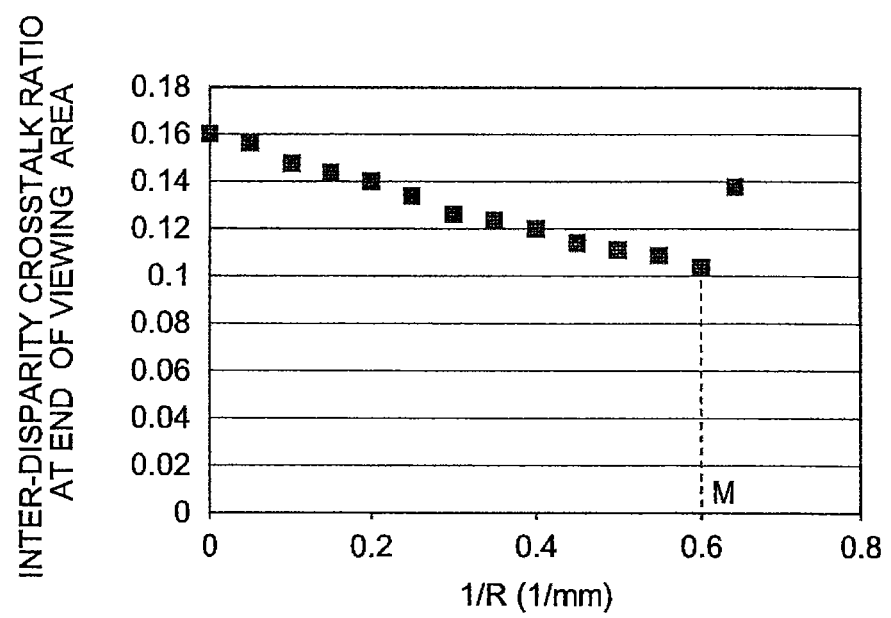
FIG. 11 is a view illustrating an example where a relationship between a reciprocal of a curvature radius of a curved surface and an inter-disparity crosstalk ratio at an end of a viewing area is calculated by numerical calculation.

As illustrated in FIG. 11, it is found that the inter-disparity crosstalk seen from a position at which the viewing area angle is the maximum is enhanced rapidly when a reciprocal 1/R of the curvature radius R of the curved surface 35 exceeds a maximum value M.

Figure 12:
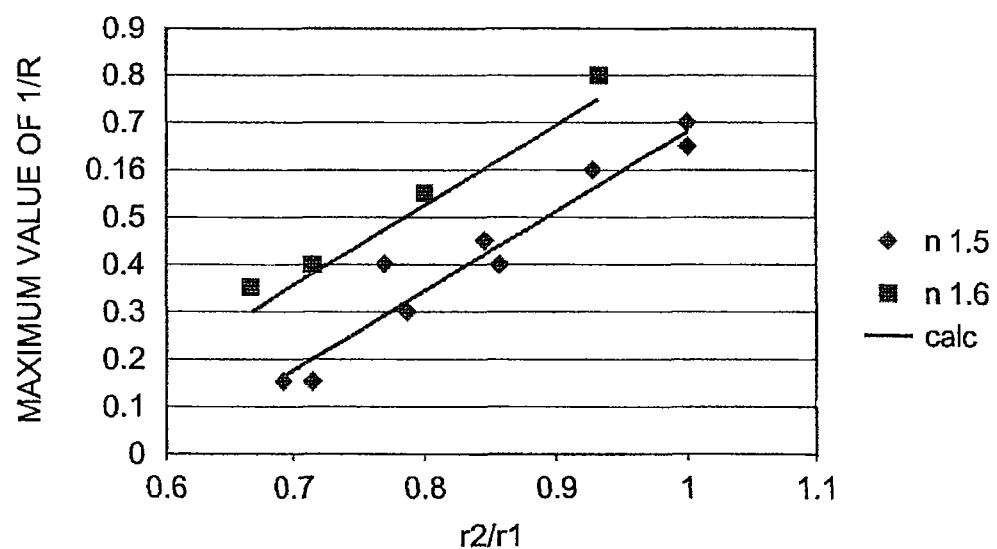
FIG. 12 is a view illustrating an example where a relationship between a ratio of curvature radii of two cylindrical lenses and a reciprocal of the curvature radii of curved surfaces is calculated by numerical calculation.

As illustrated in FIG. 12, a maximum value of the reciprocal 1/R of the curvature radius R of the curved surface 35 can be approximated to equation (7) by a numerical value calculation performed by changing the refractive index n of the cylindrical lenses 25, 45 and ratios r2/r1 of the curvature radii r1, r2 of the cylindrical lenses 25, 45.

It is possible to reduce the inter-disparity crosstalk by setting the following equation as an upper limit of the reciprocal 1/R of the curvature radius R of the curved surface 35.

$$\frac{1}{R} = \frac{1}{L}\left(1.43 \cdot \frac{r_2}{r_1} - \frac{0.42}{(n-1)}\right) \quad (7)$$

Consequently, it is desirable that the curvature radius R of the curved surface 35 is in the range which satisfies equation (8) in consideration of equation (6) and equation (7).

$$0 < \frac{1}{R} \le \frac{1}{L}\left(1.43 \cdot \frac{r_2}{r_1} - \frac{0.42}{(n-1)}\right) \quad (8)$$

The image display device or a printing method according to the above-described second embodiment and its modified example can increase the number of disparities of a display image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display device comprising:
    a display portion which displays a display image including element images arranged in a first direction; and
    a first deflection element array which opposes to the element images,
    wherein each of the element images has element pixels having a width W in the first direction, the element pixels being arranged in the first direction and composing N rows, each of the N rows including a plurality of element pixels and arranged in a second direction orthogonal to the first direction,
    and wherein the element pixels of an i-th ($1 \le i \le N-1$) row and the element pixels of an (i+1)th row which are the closest to the element pixels of the i-th row in the first direction are arranged such that a distance in the first direction between a first reference line along the second direction which passes a center of each element pixel of the i-th row in the first direction and a second reference line along the second direction which passes a center of each corresponding element pixel of the (i+1)th row is shifted by at least W/N, where N denotes a positive integer equal to or more than 2 and i denotes a positive integer.

2. The device according to claim 1, wherein the element images has a width L in the first direction and the element pixels has a height L/N in the second direction.

3. The device according to claim 2, wherein each element pixel is a modulation block and has a color and a gradation of one pixel of the display image.

4. The device according to claim 2, wherein
    the distance is represented by a number of dots which can be arranged in the first direction between the first reference line and the second reference line; and
    when each element pixel includes two dots in the first direction, each element pixel of the i-th row and each corresponding element pixel of the (i+1)th row are arranged such that the distance in the first direction between the first reference line and the second reference line is shifted by one dot.

5. The device according to claim 2, wherein the display portion has concave-curved surfaces which oppose to the first deflection element array.

6. The device according to claim 1, wherein each element pixel is a modulation block and has a color and a gradation of one pixel of the display image.

7. The device according to claim 6, wherein:
    the distance is represented by a number of dots which can be arranged in the first direction between the first reference line and the second reference line; and
    when each element pixel includes two dots in the first direction, each element pixel of the i-th row and each corresponding element pixel of the (i+1)th row are arranged such that the distance in the first direction between the first reference line and the second reference line is shifted by one dot.

8. The device according to claim 6, wherein the display portion has concave-curved surfaces which oppose to the first deflection element array.

9. The device according to claim 1, wherein:
    the distance is represented by a number of dots which can be arranged in the first direction between the first reference line and the second reference line; and
    when each element pixel includes two dots in the first direction, each element pixel of the i-th row and each corresponding element pixel of the (i+1)th row are arranged such that the distance in the first direction between the first reference line and the second reference line is shifted by one dot.

10. The device according to claim 9, wherein the display portion has concave-curved surfaces which oppose to the first deflection element array.

11. The device according to claim 1, wherein the display portion has curved surfaces which oppose to the first deflection element array.

12. The device according to claim 11, wherein:
    the first deflection element array includes first cylindrical lenses which have a convex shape and a width L in the first direction; and the concave-curved surfaces has the width L in the first direction and has a curvature radius R in a range expressed by the following equation, where n denotes a refractive index of the first cylindrical lenses, r denotes a curvature radius of the first cylindrical lenses and L denotes a width of the first cylindrical lenses in the first direction $$r/(n-1) > R \geq L/2$$

13. The device according to claim 12, wherein the curvature radius R is expressed by R=knr/(n−1), where 0.2≤k≤0.3.

14. The device according to claim 11, further comprising a second deflection element array which opposes to the first deflection element array and which is provided on an opposite side of the display portion with respect to the first deflection element array, wherein:
the first deflection element array includes first cylindrical lenses which have a convex shape and a width L in the first direction;
the second deflection element array includes second cylindrical lenses which has a concave shape and a width L in the first direction; and
the curved surfaces has the width L in the first direction and has a curvature radius R in a range expressed by the following equation, where n denotes a refractive index of the first and second cylindrical lenses, $r_1$ denotes a curvature radius of the first cylindrical lenses, $r_2$ denotes a curvature radius of the second cylindrical lenses, and L denotes a width of the first and the second cylindrical lenses in the first direction:

$$0 < \frac{1}{R} \leq \frac{1}{L}\left(1.43 \cdot \frac{r_2}{r_1} - \frac{0.42}{(n-1)}\right).$$

15. A method of printing a display image including element images arranged in the first direction on an object to be printed, each of the element images including element pixels having a width W in a first direction, the method comprising:
printing N rows of element pixels in a second direction orthogonal to the first direction, each of the N rows including N dots in the first direction, such that the element pixels of an i-th (1≤i≤N−1) row and the element pixels of an (i+1)th row which are the closest to the element pixels of the i-th row in the first direction are printed in a manner that a distance in the first direction between a first reference line along the second direction which passes a center of each element pixel of the i-th row in the first direction and a second reference line along the second direction which passes a center of each corresponding element pixel of the (i+1)th row is shifted by W/N dots, where W denotes an arbitrary positive numerical value, N denotes a positive integer equal to or more than 2 and i denotes a positive integer.

16. The method according to claim 15, wherein, when a width of each element image in the first direction is Ly inch and resolution of printing is S dpi, a pixel which includes Ly·S/N dots in the second direction orthogonal to the first direction is printed as each element pixel.

17. The method according to claim 15, wherein printing is performed to express a color and a gradation of one pixel of the display image by halftone processing using each element pixel as a modulation block.

18. The method according to claim 16, wherein printing is performed to express a color and a gradation of one pixel of the display image by halftone processing using each element pixel as a modulation block.

* * * * *